United States Patent [19]

Okura

[11] Patent Number: 5,121,525
[45] Date of Patent: Jun. 16, 1992

[54] SHIM OF A CABLE CLAMP

[76] Inventor: Masahiko Okura, 3-8-3, Higashi Shibuya, Tokyo, Japan

[21] Appl. No.: 719,893

[22] Filed: Jun. 24, 1991

[51] Int. Cl.⁵ .............................................. F16G 11/04
[52] U.S. Cl. ............................ 24/136 R; 24/115 M; 403/314
[58] Field of Search .................... 24/136 R, 115 M; 403/314, 211, 374, 409.1

[56] References Cited

U.S. PATENT DOCUMENTS

| 1,365,411 | 1/1921 | Kearney | 24/136 R |
| 1,759,591 | 5/1930 | Pleister et al. | 24/115 M |
| 4,542,562 | 9/1985 | Okura | 24/136 R |
| 4,637,098 | 11/1987 | Okura et al. | 24/136 R |
| 4,939,821 | 7/1990 | Frank, Jr. | 24/136 R |

FOREIGN PATENT DOCUMENTS 26722  7/1954  Finland ............................. 24/115 M

*Primary Examiner*—Laurie K. Cranmer
*Attorney, Agent, or Firm*—Moonray Kojima

[57] ABSTRACT

A cable clamp shim, wherein a side part thereof is bent at a right angle to the remainder thereof, with the slit being in the remainder portion for holding the sleeve of the clamp, so that the side part of the shim fits closely to the outside surface of the sleeve and thereby eliminates possibility of injury to the worker by the edge of the shim, and improves the positioning security of the shim in the clamping arrangement.

3 Claims, 2 Drawing Sheets

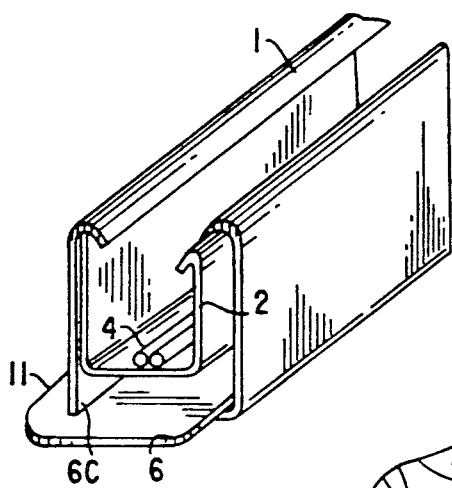
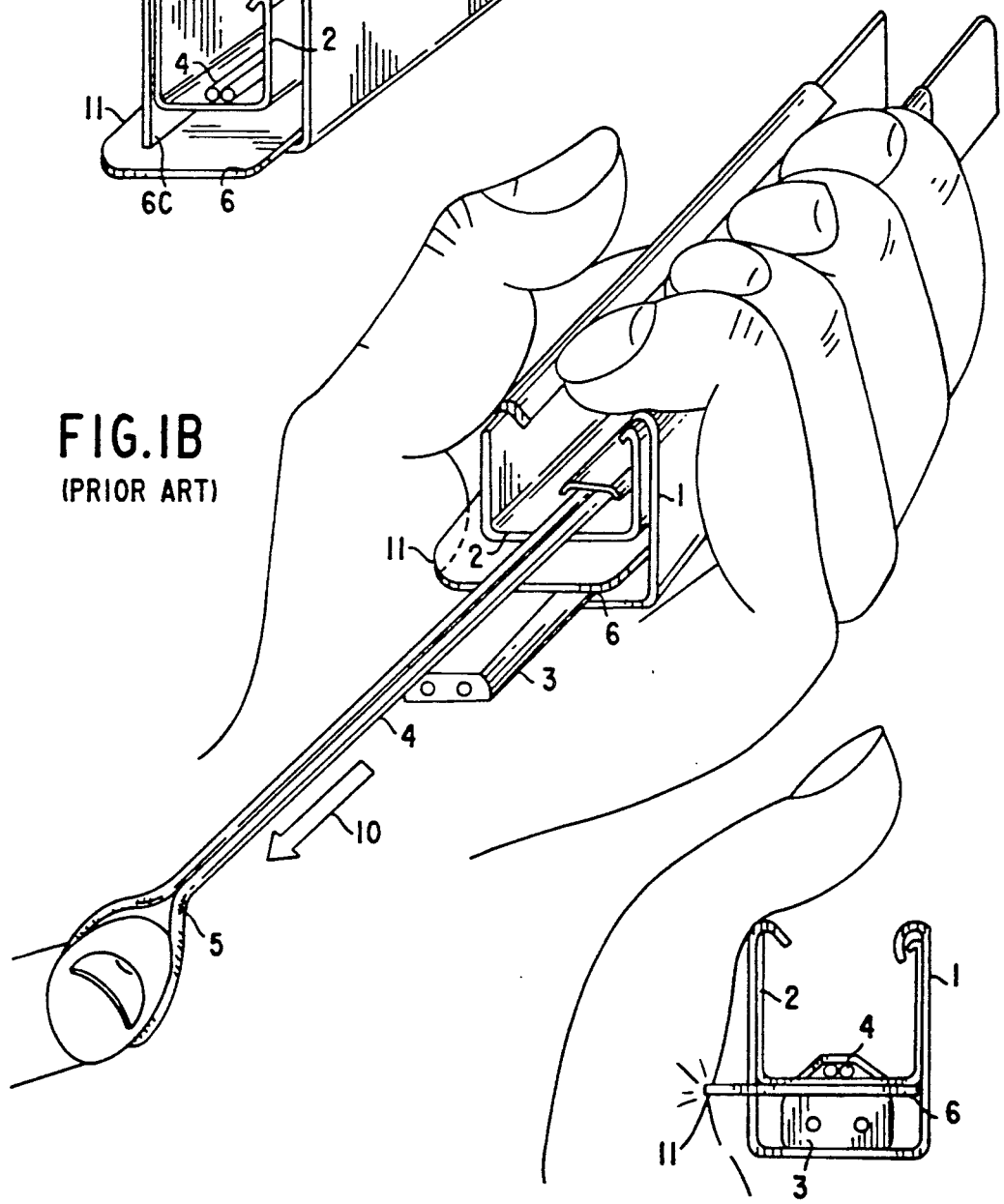
FIG.1A (PRIOR ART)
FIG.1B (PRIOR ART)
FIG.1C (PRIOR ART)

SHIM OF A CABLE CLAMP

BACKGROUND OF THE INVENTION

1. Field of Invention

This invention relates to shims for cable clamps, and more particularly, to improvements in such shims.

2. Discussion of the Prior Art

FIGS. 1A, 1B, 1C show pictorially, a prior art type shim used for cable clamps, wherein a sleeve 1, fits over a cable 3, with a wedge 2 disposed within the clamp to clamp the cable 3 to the clamp. The wedge 2 is moved, e.g. in the direction of arrow 10, by suspending ring 5 and attached wire 4. Between cable 3 and wedge 2 is disposed a shim 6, which has a longitudinal slit 6C through which sleeve is is fitted. One of the longitudinal edges, e.g. edge 11, of shim 6 is disposed, in this prior art device, to be outwardly disposed, as shown, so that when the human operator grips the clamp, edge 11 tends to come in contact with the palm of the operator and often causes cuts and injury thereto (see FIG. 1C)

Thus, the prior art shim arrangement leaves much to be desired, and is in fact, dangerous to worker safety and needs improvement.

SUMMARY OF THE INVENTION

Accordingly, an object of the invention is to overcome the aforementioned and other deficiencies of the prior art.

Another object is to provide a shim for cable clamp which is safe for the operator and prevents injury to the operator's hand when the cable clamp is gripped during wedging operation.

A further object is to more securely fit the shim to the sleeve and wedge arrangement.

A still further object is to provide a simple, yet effective device which performs different functions, such as shimming, secure fitting, and yet be functional and safe.

BRIEF DESCRIPTION OF THE DRAWINGS

FIGS 1A, 1B, 1C, are pictorial diagrams depicting a prior art clamping device using a prior art type shimming arrangement.

DETAILED DESCRIPTION OF THE PREFERRED EMBODIMENTS

Figure 2:
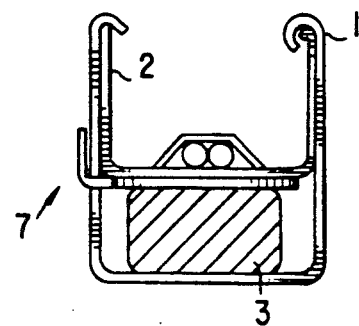
FIG. 2 is an end view of an illustrative embodiment of the invention shimming arrangement as incorporated in a cable clamp.

FIGS. 2-5 contain the same identifying numerals for the same corresponding parts as in FIGS. 1A-C, and will not be discussed further hereat. Shim 7 being different is labelled differently from shim 6 of FIGS 1A-C.

Shim 7, which may be of metal, plastic or other suitable material, and be of suitable dimension to fit in the arrangement as depicted, e.g. the thickness can be about 0.5 cm for some cases, comprises a flat main body part 7A, a side part 7B, which is disposed at substantially right angles to body part 17A, with corners thereof being rounded, as shown, and with the main part 7A having an elongated slit 7C located toward the side part 7B.

As shown by the dotted lines 7D, the elongated slit can have an opening at one end so that the shim can be slipped in and taken out from the sleeve 1 in the longitudinal direction.

As depicted in FIGS. 1A,1B,1C, and FIGS. 2-5 (by closed slit 7C), sleeve 1 is fitted into the slit 6C or 7C, and then the cable 3 is fitted between the shim 7 (or 6) and sleeve 1 with wedge 2 disposed above the slim.

As depicted, shim 7 has a right angled side part 7B, which is fitted close to the upright surface of sleeve 1 so that when the operator grabs the clamp during wedging operation, there is no edge 11 sticking out which would come into contact with and possibly injure his hand. Thus, advantageously, with the invention, the problem of worker injury prevalent with prior shims, as shown in FIGS 1A-C, is substantially eliminated.

Also, advantageously, by having the side part 7B at a right angle substantially to the main part 7A, the fitting thereof next to the sleeve 1 is greatly improved and the shim is more securely fitted thereto.

Figure 3:
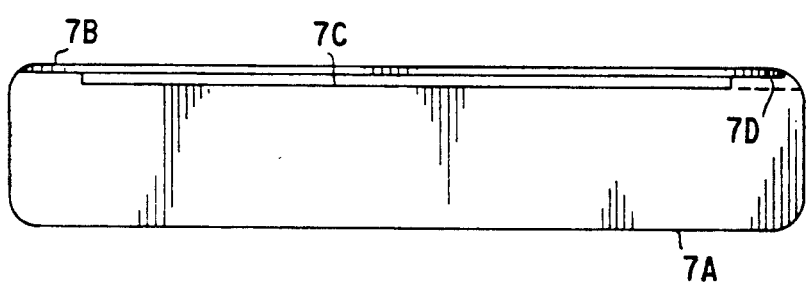
FIG. 3 is a top view of the illustrative shim.
Figure 4:
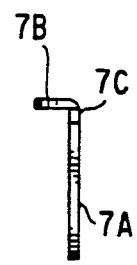
FIG. 4 is a side view of the illustrative shim.
Figure 5:
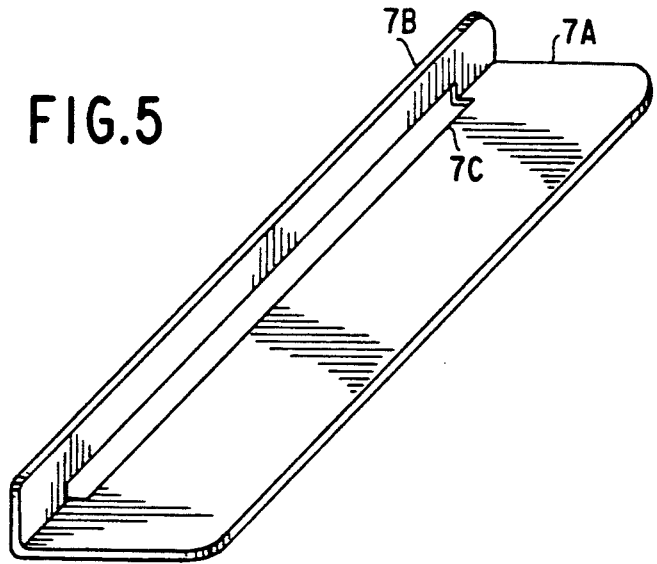
FIG. 5 is a perspective view of the illustrative shim.

Also, as shown in FIG. 3 by dotted lines 7D, the shim can be readily slipped into the clamping arrangement in the longitudinal direction instead of from the top of sleeve 1.

The invention is advantageously very simple and only a single bending operation is needed to secure the safety of the worker, and top improve the fitting of the shim to the clamp.

What is claimed is:

1. In a cable clamping arrangement wherein a cable is clamped to a sleeve by a wedge with a shim disposed between the wedge and cable, said shim having an elongated slit therein with said sleeve being fitted through said slit, the improvement comprising said shim having a main part for disposition between the wedge and the cable, and a side part being disposed at substantially right angles to said main part for disposition next to said sleeve outside of the wedge and cable.

2. The arrangement of claim 1, wherein said slit is a closed slit.

3. The arrangement of claim 1, wherein said slit is closed at one longitudinal end and open at another longitudinal end so that said shim is positioned to have said sleeve fitted in said slit through said open end.

* * * * *